(12) United States Patent
Alameda et al.

(10) Patent No.: US 8,693,183 B1
(45) Date of Patent: Apr. 8, 2014

(54) ADAPTER FOR RUGGEDIZED PERSONAL DATA ASSISTANT

(75) Inventors: Patti Alameda, Budd Lake, NJ (US); David J. Rychalsky, East Brunswick, NJ (US); James Ireland, Lake Hopatcong, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 461 days.

(21) Appl. No.: 12/947,993

(22) Filed: Nov. 17, 2010

(51) Int. Cl.
*G06F 1/16* (2006.01)

(52) U.S. Cl.
USPC ............ 361/679.41; 361/679.56; 361/679.57; 361/679.413

(58) Field of Classification Search
USPC ............ 361/679.56, 679.57, 679.41, 679.44, 361/679.43; 710/303, 304; 141/383
See application file for complete search history.

(56) References Cited

U.S. PATENT DOCUMENTS

| | | | |
|---|---|---|---|
| 2003/0110337 A1* | 6/2003 | Verdun et al. | 710/303 |
| 2003/0161096 A1* | 8/2003 | Yin | 361/683 |
| 2005/0162824 A1* | 7/2005 | Thompson | 361/686 |
| 2005/0174727 A1* | 8/2005 | Thomas et al. | 361/681 |
| 2007/0157503 A1* | 7/2007 | Holmberg | 42/124 |
| 2009/0213536 A1* | 8/2009 | Lewandowski et al. | 361/679.43 |

* cited by examiner

*Primary Examiner* — Tuan T Dinh
*Assistant Examiner* — Steven T Sawyer
(74) *Attorney, Agent, or Firm* — Henry S. Goldfine

(57) ABSTRACT

An adapter for a ruggedized personal digital assistant (RPDA) may include a generally L-shaped housing with first and second legs. The first leg may have a generally tubular shape and may include a protruding ridge that is slidable in a stylus groove of the RPDA. The first leg may include a connector for a multi-function cable and an opening for a communication cable. The second leg may include a power connector for engaging the power-in port of the RPDA and a serial data connector for engaging the serial data port of the RPDA. A multi-function cable assembly may be disposed in the first leg and may connect to the multi-function cable connector. Inside the first leg, the multi-function cable assembly may split into a plurality of cables for connecting to the RPDA.

2 Claims, 8 Drawing Sheets

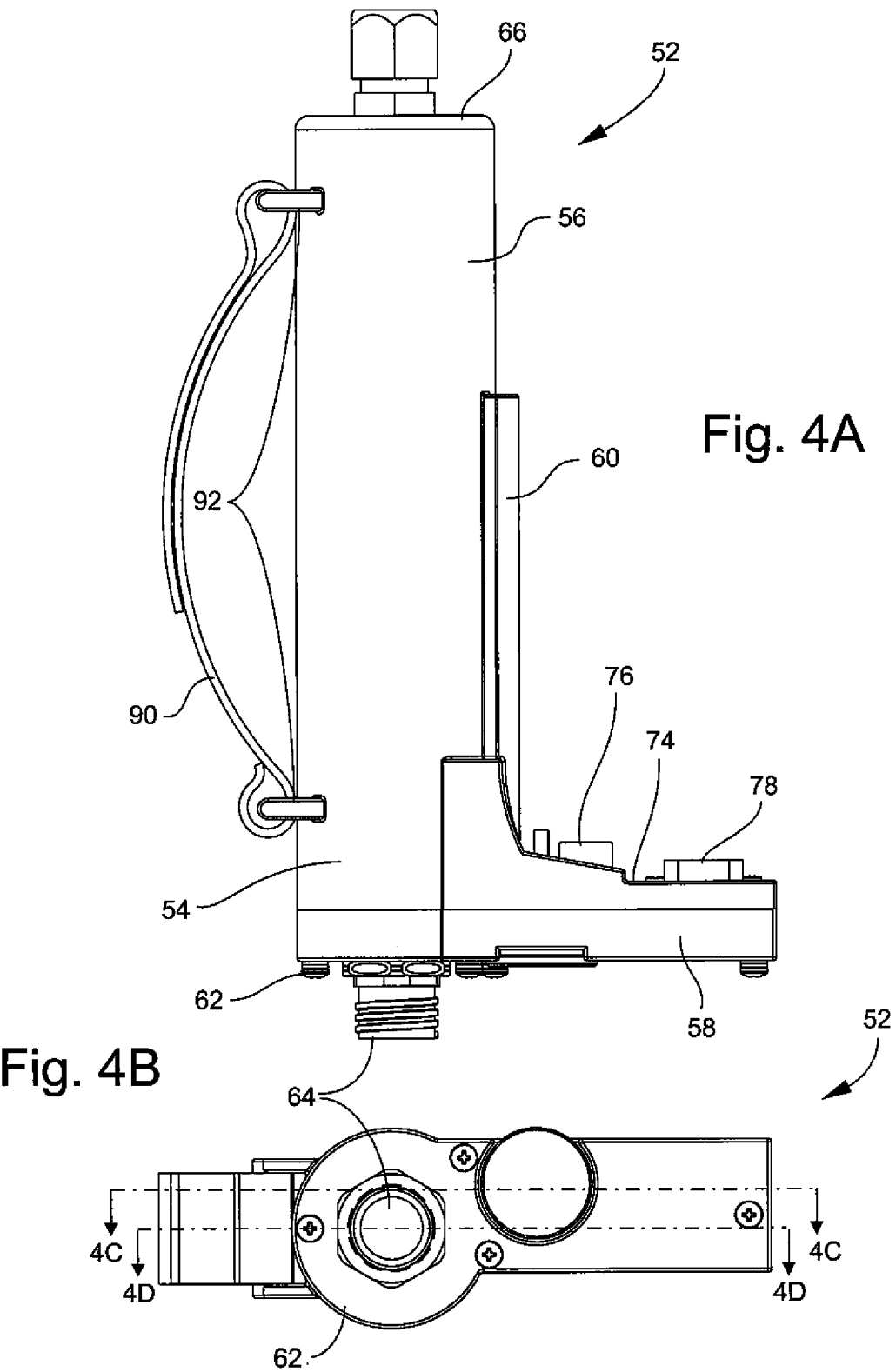

ADAPTER FOR RUGGEDIZED PERSONAL DATA ASSISTANT

STATEMENT OF GOVERNMENT INTEREST

The inventions described herein may be manufactured, used and licensed by or for the U.S. Government for U.S. Government purposes.

BACKGROUND OF THE INVENTION

The invention relates in general to personal data assistants (PDAs) and in particular to ruggedized personal data assistants (RPDAs).

PDAs, also known as palmtop computers, are small, lightweight computers that may be held in one's palm. A PDA may be only a few inches wide, for example, 2-5 inches. A PDA may include a visual display. The visual display may be a touchscreen. The PDA may include a stylus for touching the touchscreen. The PDA housing may include a groove for storing the stylus when not in use. A PDA may include a variety of interfaces for connecting to external devices. One interface may be an interface for powering the PDA and/or charging batteries in the PDA. Another interface may be a serial data port, for example, an RS-232 (Recommended Standard 232) port or a USB (Universal Serial Bus) port. Further interfaces may include card slots, such as PCMCIA (Personal Computer Memory Card International Association) slots.

An RPDA is a PDA that is designed for more rugged use. An RPDA may have a housing made of a strong and durable material. Compared to PDAs, RPDAs may be more shock resistant, more waterproof, better able to withstand temperature extremes, and less prone to malfunction from electromagnetic interference. FIG. 1 schematically shows an RPDA 10 having a touchscreen 12, a housing 14, a pair of PCMCIA slots 16 and 18, a stylus 20, grooves 22 and 24 formed in housing 14 for storing stylus 20, a serial data port 26, and a direct current power connection 28.

RPDA 10 may be a component of a portable fire control apparatus for indirect fire weapons. An example of a portable fire control apparatus for indirect fire weapons is disclosed in U.S. Pat. No. 7,698,983 issued on Apr. 20, 2010 to Pinto, Schneck, Alameda, and Coradeschi. RPDA 10 may communicate digitally to a Single Channel Ground/Airborne Radio System (SINCGARS) radio via a wired connection. To communicate with a SINCGARS radio, RPDA 10 may include radio interface hardware 30 (FIG. 2) connected to RPDA 10 via, for example, PCMCIA slot 18. Radio interface hardware 30 may be housed in housing 32 fixed to RPDA 10. Housing 32 may include connector 34 for connecting with a SINCGARS digital communication cable 36. Radio interface hardware 30 and housing 32 may be available from Elbit Systems of America, McLean, Va.

FIG. 3 is a schematic drawing of an embodiment of a fire control configuration for the RPDA 10 of FIG. 2. RPDA 10 may be connected to several components of a portable fire control apparatus 50. For example, radio cable 36 may be connected to connector 34 of RPDA 10. Serial data port 26 of RPDA 10 may be connected to serial data cable 38. Power input connection 28 of RPDA 10 may be connected to power cable 40. Serial data cable 38, power cable 40, and radio cable 36 may be combined into a single cable 42. At fire control apparatus 50, cable 42 may be split into radio cable 36, serial data cable 38, and power cable 40. Power cable 40 may connect to power supply 46. Serial data cable 38 may connect to another computing device, for example, a platform integration kit (PIK) 48. Radio cable 36 may connect to a SINCGARS radio 44.

A problem with the configuration of FIG. 3 is that users of RPDA 10 may often use cable 42 as a handle for lifting, holding, and moving RPDA 10. Thus, cable 42 and its connections to RPDA 10 may become stressed and fatigued and may ultimately fail. The jacket of power cable 40 at power input connection 28 of RPDA 10 may rip or tear. The screws used to fix serial data cable 38 to data port 26 of RPDA 10 may be lost, resulting in a partial or complete loss of connection between cable 38 and RPDA 10.

A need exists for an apparatus for securely connecting multiple cables to an RPDA.

SUMMARY OF THE INVENTION

It is an object of the invention to provide an apparatus for securely connecting multiple cables to an RPDA.

One aspect of the invention is an adapter for a ruggedized personal digital assistant (RPDA). The RPDA may have a groove for storing a stylus, a power-in port, and a serial data port. The adapter may include a generally L-shaped housing having a first leg and a second leg. The first leg may have a generally tubular shape and may include a protruding ridge that is slidable in the groove of the RPDA. The bottom of the first leg may include a connector for a multi-function cable. The top of the first leg may include an opening for a communication cable.

The second leg may include a through-hole for receiving a thumbscrew. The top of the second leg may include a power connector for engaging the power-in port of the RPDA and a serial data connector for engaging the serial data port of the RPDA. A thumbscrew may be disposed in the through-hole in the second leg, for threadingly engaging an opening in the RPDA adjacent the power-in port.

The adapter may include a multi-function cable assembly disposed in the first leg and connected to the multi-function cable connector. The multi-function cable assembly may split into first, second, and third cables in the first leg. The first cable may extend through the opening in the top of the first leg. The second cable may connect to the power connector in the second leg. The third cable may connect to the serial data connector in the second leg.

The protruding ridge on the first leg may include a bulbous edge. The side of the first leg opposite the side having the protruding ridge may include a strap fixed thereon. The strap may be fixed to a pair of spaced-apart projections. Each of the spaced-apart projections may include an opening therein for receiving the strap.

Another aspect of the invention is an apparatus that includes an RPDA and an adapter removably fixed to the RPDA. The RPDA may have a groove for storing a stylus, a power-in port, and a serial data port. The adapter may include a generally L-shaped housing having a first leg and a second leg. The first leg may have a generally tubular shape and may include a protruding ridge that slidably engages the groove of the RPDA. The bottom of the first leg may include a connector for a multi-function cable. The top of the first leg may include an opening for a communication cable.

A further aspect of the invention is an adapter for a ruggedized personal digital assistant (RPDA). The RPDA may have a groove for storing a stylus, a power-in port, and a serial data port. The adapter may include a generally L-shaped housing having a first leg and a second leg. The first leg may have substantially planar exterior and interior surfaces. The interior surface may include a protruding ridge that is slidable in the groove of the RPDA. The bottom of the second leg may include a connector for a multi-function cable. The second leg may include a through-hole for receiving a thumbscrew. The top of the second leg may include a power connector for engaging the power-in port of the RPDA and a serial data connector for engaging the serial data port of the RPDA.

The adapter may include a multi-function cable assembly disposed in the second leg and connected to the multi-function cable connector. The multi-function cable assembly may split into a first cable that connects to the power connector and a second cable that connects to the serial data connector.

In another aspect of the invention, an adapter is removably fixed to an RPDA. The RPDA may have a groove for storing a stylus, a power-in port, and a serial data port. The adapter may include a generally L-shaped housing having a first leg and a second leg. The first leg may have substantially planar exterior and interior surfaces. The interior surface may include a protruding ridge that is slidable in the groove of the RPDA. The bottom of the second leg may include a connector for a multi-function cable. The second leg may include a through-hole for receiving a thumbscrew. The top of the second leg may include a power connector for engaging the power-in port of the RPDA and a serial data connector for engaging the serial data port of the RPDA.

The adapter may include a multi-function cable assembly disposed in the second leg and connected to the multi-function cable connector. The multi-function cable assembly may split into a first cable that connects to the power connector and a second cable that connects to the serial data connector.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 4A is a side view of an embodiment of an adapter for an RPDA.

FIG. 4B is a bottom view of FIG. 4A.

DETAILED DESCRIPTION OF THE PREFERRED EMBODIMENTS

An adapter for an RPDA may be separated from the RPDA without the need of tools. The adapter may be tethered to a fire control system with a single cable. The single cable may be split into multiple cables inside the adapter. The adapter may allow the RPDA user to operate and securely hold the RPDA in his/her hand. The adapter may help prevent damage to cables connected to the RPDA.

Figure 1:
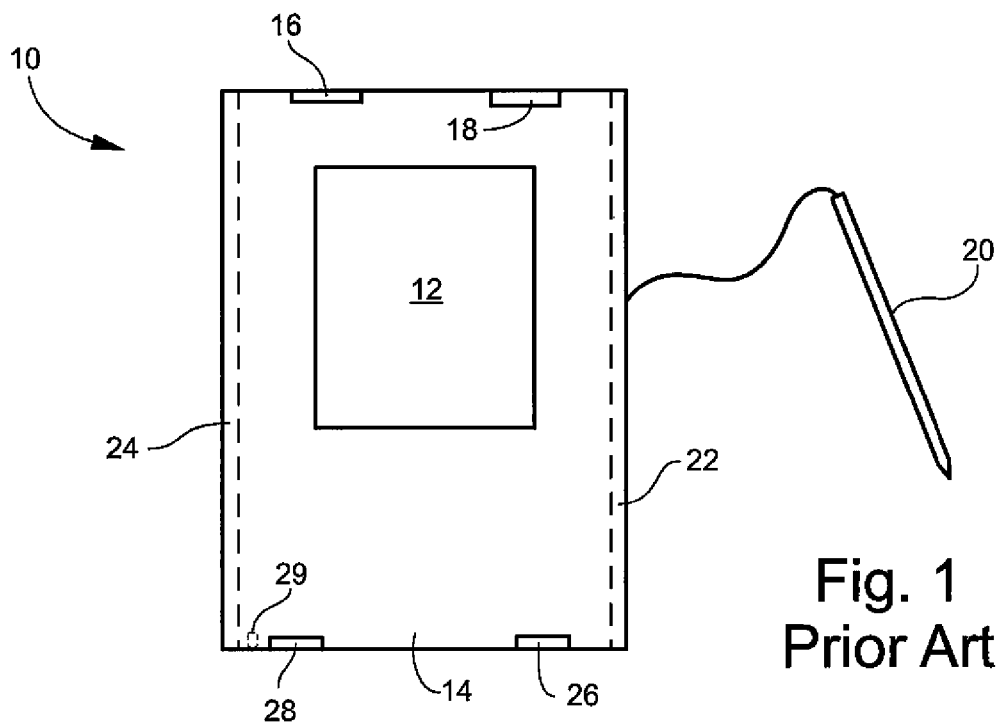
FIG. 1 is a schematic drawing of a known RPDA.
Figure 2:
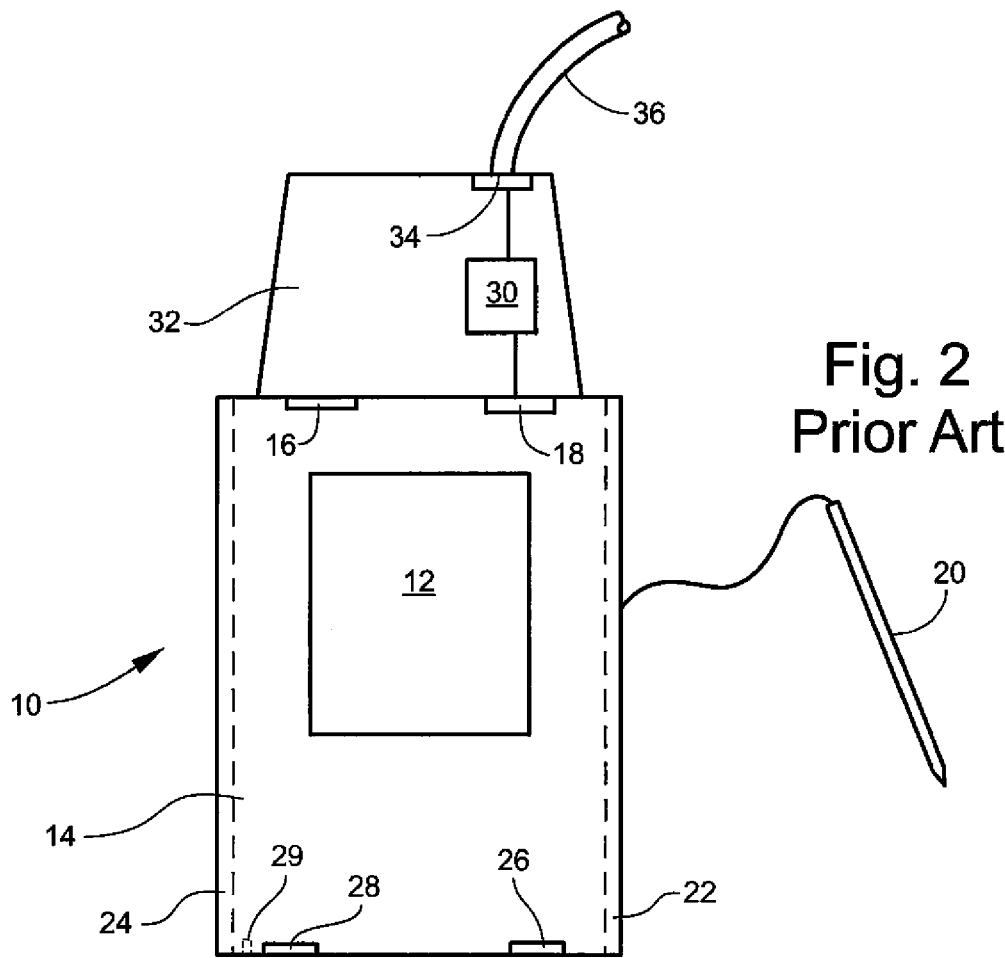
FIG. 2 is a schematic drawing of the RPDA of FIG. 1 with a radio communication adapter.
Figure 4C:
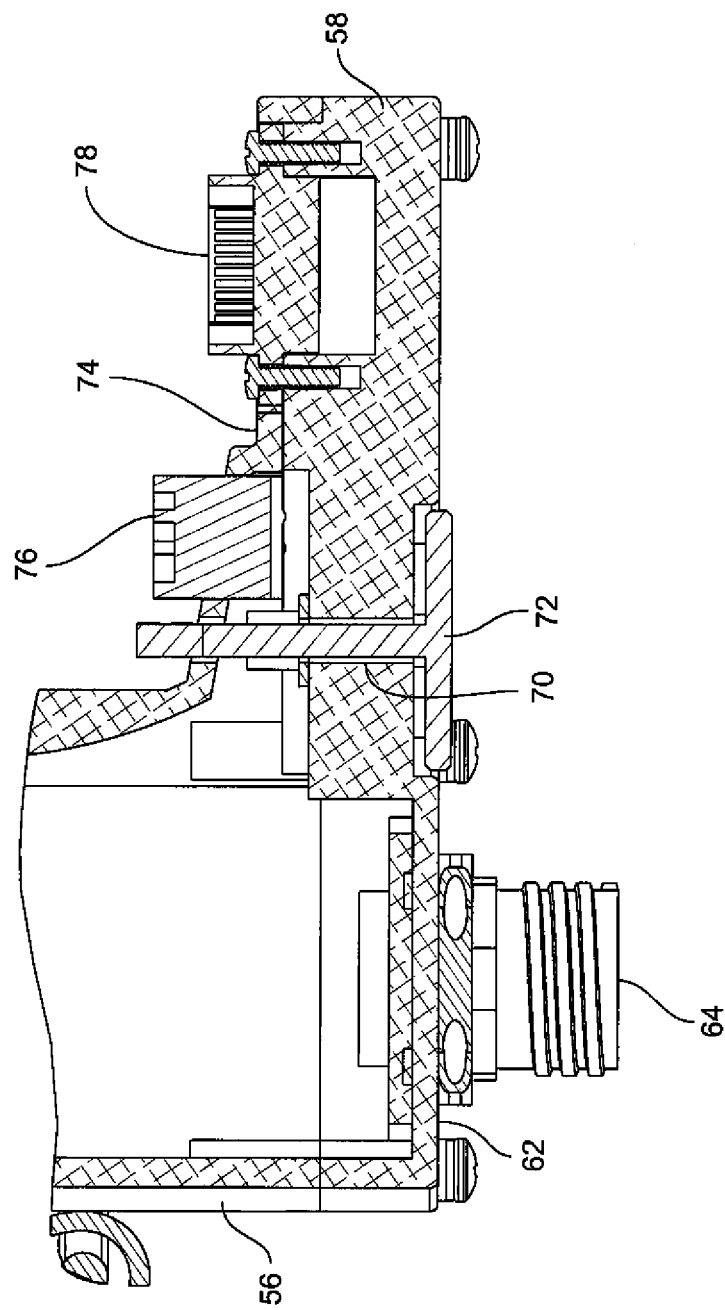
FIG. 4C is partial sectional view taken along the line 4C-4C of FIG. 4B.
Figure 4D:
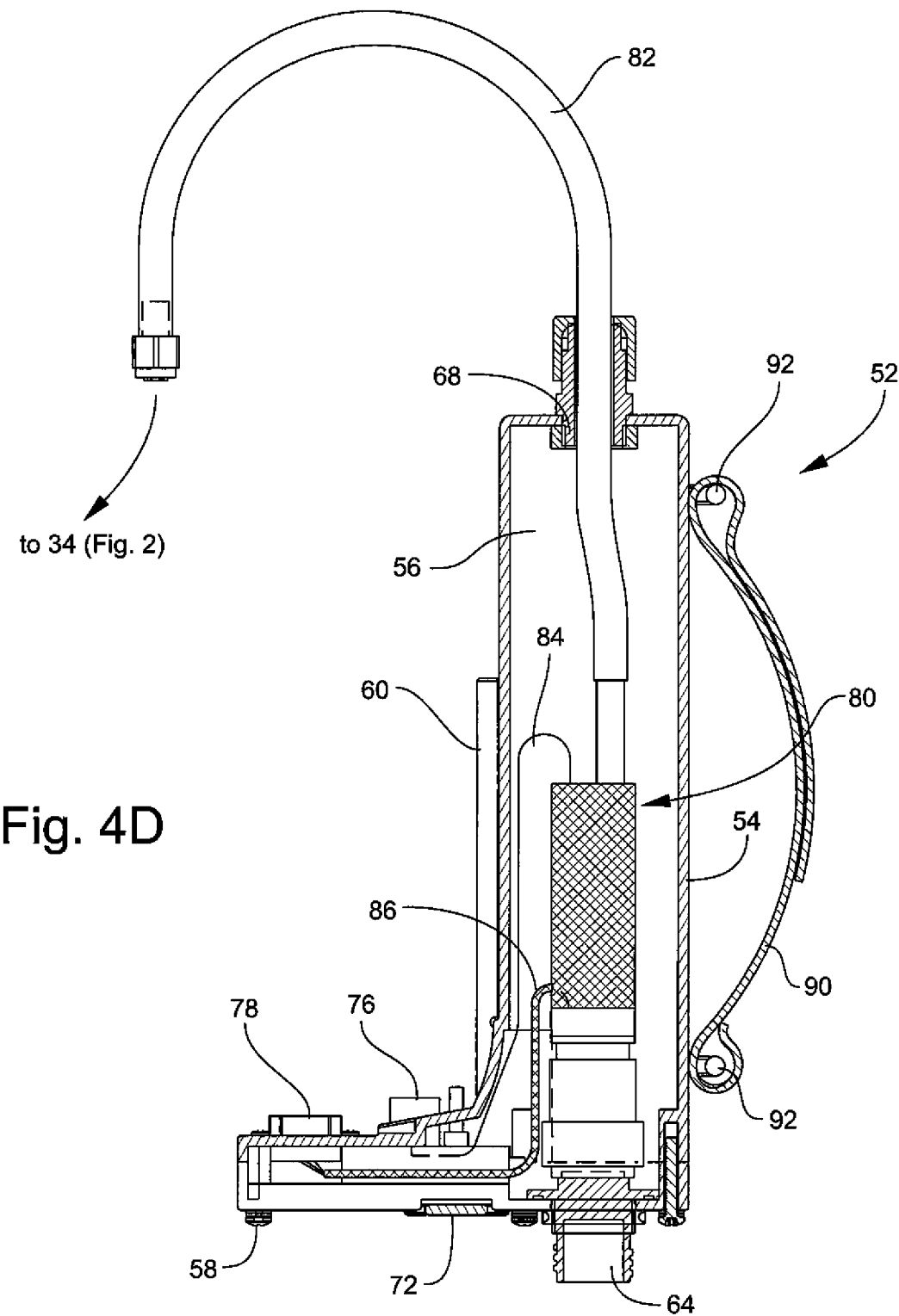
FIG. 4D is sectional view taken along the line 4D-4D of FIG. 4B, with the addition of a multi-function cable assembly.

Referring to FIGS. 4A-E, one embodiment of an adapter 52 for RPDA 10 may include a generally L-shaped housing 54 having a first leg 56 and a second leg 58. First leg 56 may have a generally tubular shape. A ridge 60 may protrude from leg 56. Ridge 60 may be slidable in groove 24 (FIG. 2) of RPDA 10. A bottom 62 of first leg 56 may include a connector 64 for multi-function cable 42 (FIG. 2). A top 66 of first leg 56 may include an opening 68 (FIG. 4D). Second leg 58 may include a through-hole 70 (FIG. 4C) for receiving a thumbscrew 72. A top 74 of second leg 58 may include a power connector 76 for engaging power-in port 28 (FIG. 2) of RPDA 10. The top 74 of second leg 58 may include a serial data connector 78 for engaging serial data port 26 (FIG. 2) of RPDA 10.

Thumbscrew 72 may be disposed in through-hole 70 in second leg 58 and may threadingly engaging an opening 29 (FIG. 2) in RPDA 10 adjacent power-in port 28.

A multi-function cable assembly 80 (FIG. 4D) may be disposed in first leg 56 and may be connected to multi-function cable connector 64. In first leg 56, multi-function cable assembly 80 may split into a first cable 82, a second cable 84, and a third cable 86. First cable 82 may extend through opening 68 in top 66 of first leg 56 and thence to connector 34 (FIG. 2). Cable 82 may replace cable 36 at connector 34. Second cable 84 may connect to power connector 76 in second leg 58. Third cable 86 may connect to serial data connector 78 in second leg 58.

Figure 4E:
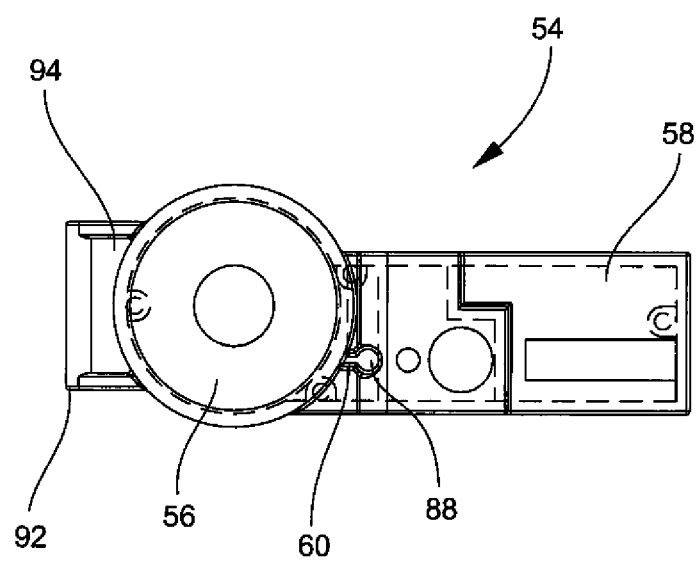
FIG. 4E is a top view of the housing only of the adapter of FIG. 4A.
Figures 5A, 5B:
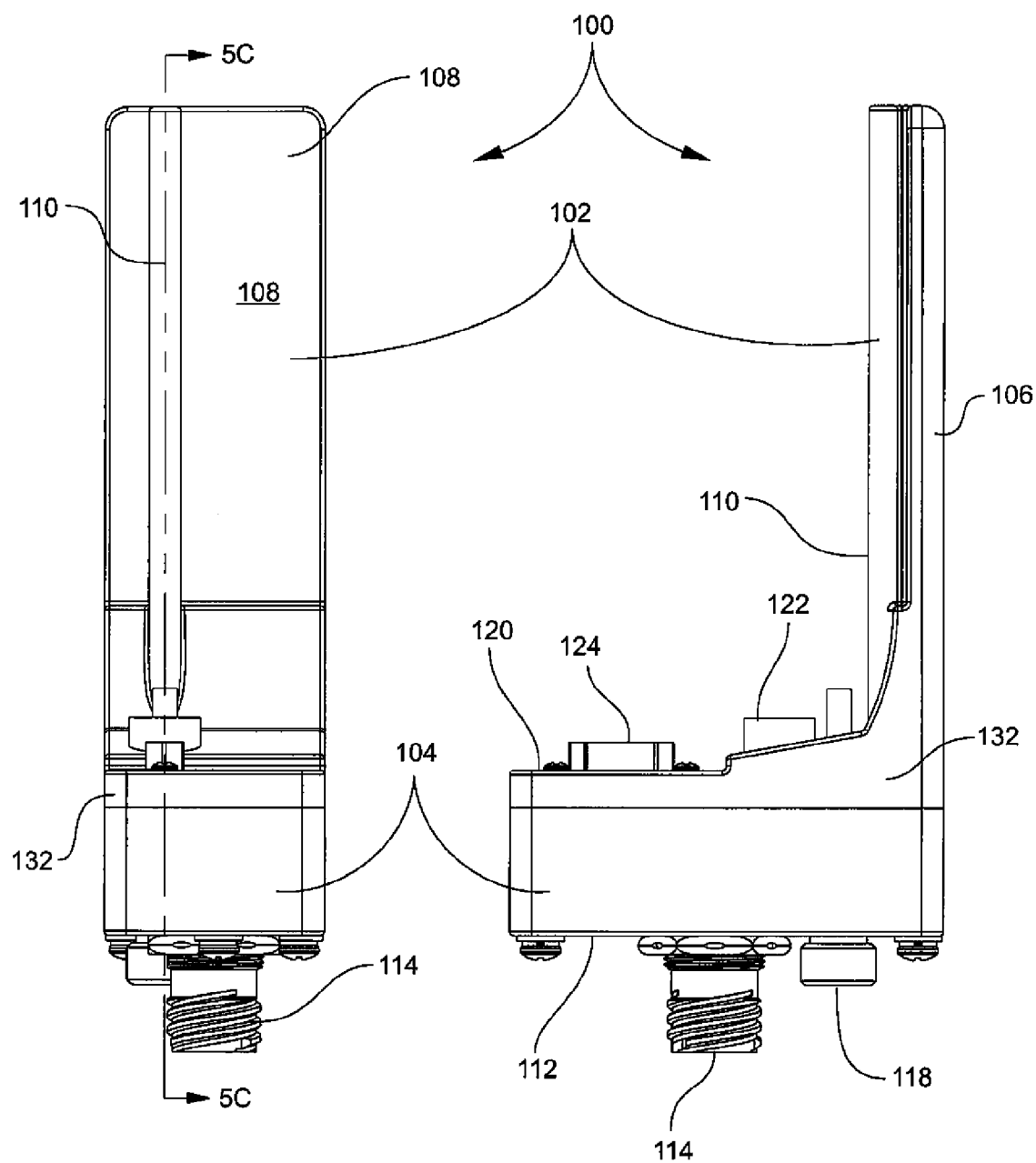
FIG. 5A is a side view of another embodiment of an adapter for an RPDA.
FIG. 5B is an end view of FIG. 5A.
Figure 5C:
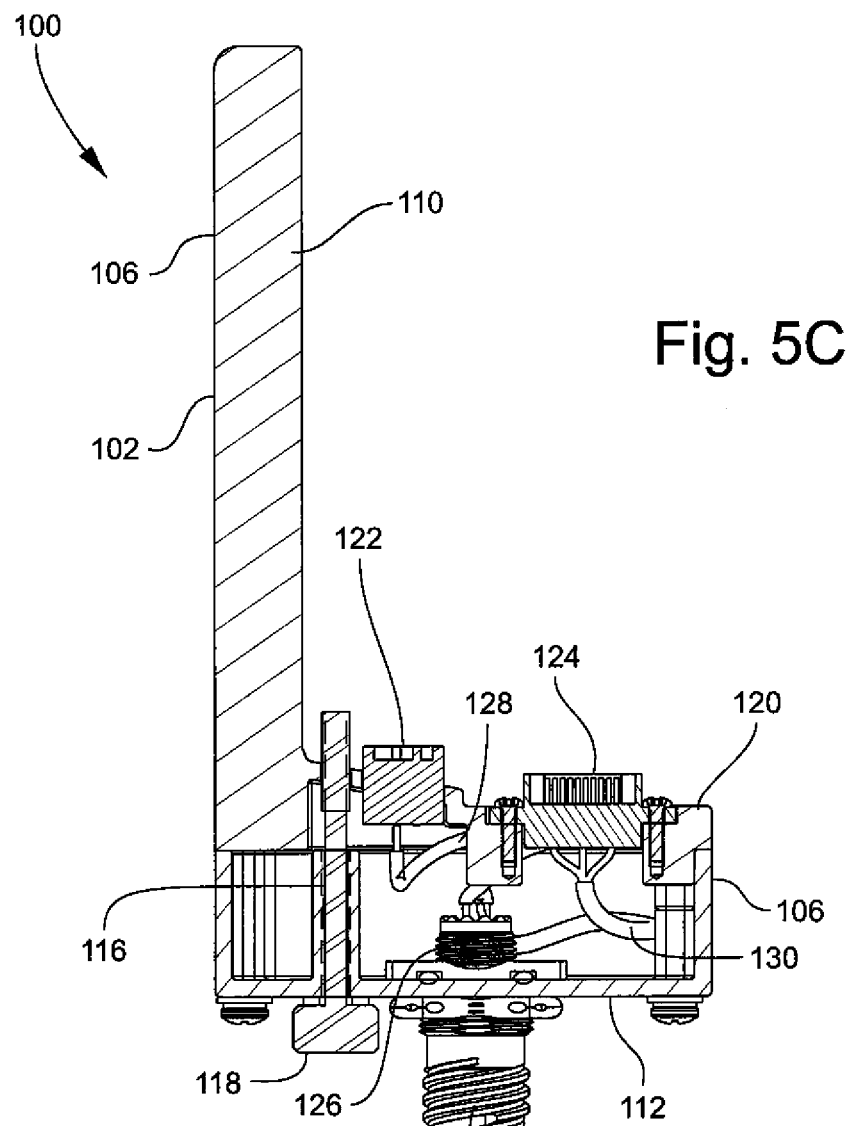
FIG. 5C is a sectional view along the line 5C-5C of FIG. 5B.
Figure 5D:
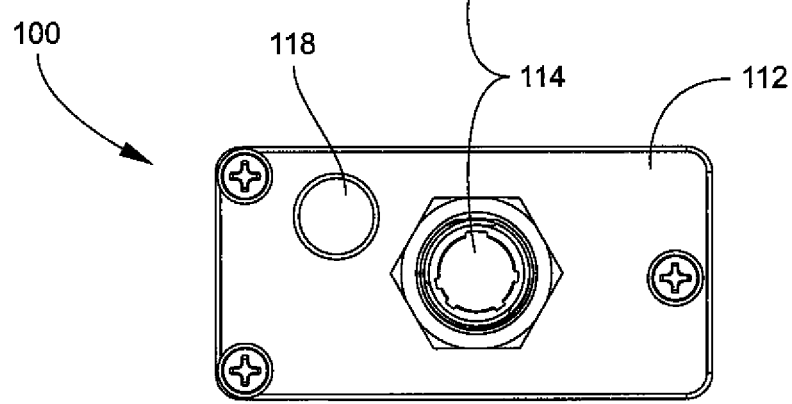
FIG. 5D is a bottom view of FIG. 5A.

FIG. 4E is a top view of housing 54. Generally L-shaped housing 54 may be made of, for example, aluminum. Protruding ridge 60 on first leg 56 may include a bulbous edge 88. Bulbous edge 88 may prevent ridge 60 from being pulled out transversely from groove 24 of RPDA 10. A side of first leg 56 opposite a side having protruding ridge 60 may include a strap 90 (FIG. 4D) fixed thereon. Strap 90 may be fixed to a pair of spaced-apart projections 92. Each of spaced-apart projections 92 may include an opening 94 therein for receiving strap 90.

Figure 3:
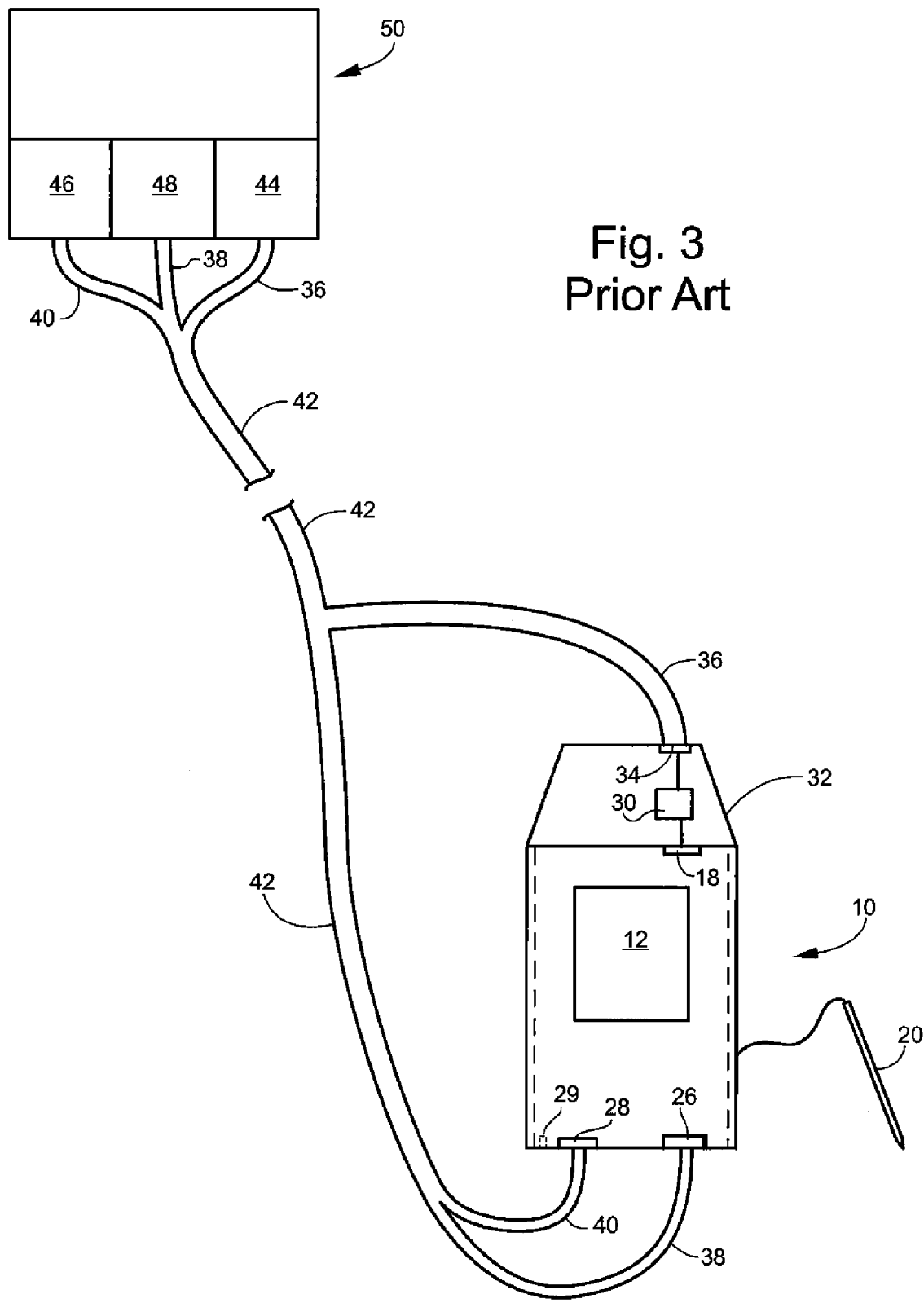
FIG. 3 is a schematic drawing of an embodiment of a fire control configuration for the RPDA of FIG. 2.

To assemble adapter 52 to RPDA 10, ridge 60 of adapter 52 may be slid into groove 24 on the side of RPDA 10, from the bottom. Thumbscrew 72, disposed in through-hole 70, may be used to secure adapter 52 to RPDA 10 via threaded hole 29 adjacent power-in port 28. Typically, hole 29 is an original equipment feature provided in RPDA 10 to secure a power connection. The single connector 64 at bottom 62 of leg 56 may be used to connect to one end of cable 42. The other end of cable 42 may be routed to the fire control apparatus 50 (FIG. 3). First cable 82 may be connected to connector 34 on housing 32.

Adapter 52 may provide an ergonomic handgrip when attached to RPDA 10. Strap 90 may be, for example, a VELCRO wrist strap. Strap 90 may help the user maintain a solid grip of RPDA 10, without worry of accidentally dropping it. Multi-function cable assembly 80 may be secured and protected within adapter 52. After thumbscrew 72 is tightened and cable 42 is connected to connector 64, the three cables 82, 84, and 86 may not be affected by user movements, in contrast to the prior art.

Adapter 52 may be easily separated from RPDA 10 by turning thumbscrew 72 and sliding ridge 60 out of groove 24 of RPDA 10. Adapter 52 may reduce the chance of failure of the various cables and cable connections. Adapter 52 may improve the operation of RPDA 10 and fire control system 50. Thus, the user may have more reliable and efficient equipment to complete the mission.

Some RPDAs may not require a communication cable, such as radio communication cable 36. Thus, the RPDA may not require radio interface hardware 30 and housing 32. In that case, an adapter for RPDA 10 may provide the means to connect a power cable and a serial data cable, such as power cable 40 and serial data cable 38. Referring to FIGS. 5A-D, an adapter 100 for an RPDA 10 may include a generally L-shaped housing 132 having a first leg 102 and a second leg 104.

First leg 102 may have substantially planar exterior and interior surfaces 106, 108. Interior surface 108 may include a protruding ridge 110 that is slidable in groove 24 of RPDA 10. Ridge 110 may have a bulbous edge, akin to bulbous edge 88 of ridge 60. A bottom 112 of second leg 104 may include a connector 114 for a multi-function cable. Second leg 104 may include a through-hole 116 (FIG. 5C) for receiving a thumbscrew 118. A top 120 of second leg 104 may include a power connector 122 for engaging power-in port 28 of RPDA 10. Top 120 of second leg 104 may include a serial data connector 124 for engaging serial data port 26 of RPDA 10.

Thumbscrew 118 may be disposed in through-hole 116 in second leg 104 and may threadingly engage opening 29 in RPDA 10 adjacent power-in port 28.

A multi-function cable assembly 126 may be disposed in second leg 104. Multi-function cable assembly 126 may be connected to multi-function cable connector 114. Inside of second leg 104 (FIG. 5C), multi-function cable assembly 126 may split into a first cable 128 that connects to power connector 122 and a second cable 130 that connects to serial data connector 124. Installation and removal of adapter 100 to and from RPDA 10 is similar to that of adapter 52. Ridge 110 of adapter 100 may slide in groove 24 of RPDA 10 and thumbscrew 118 may secure adapter 100 to RPDA 10 via threaded hole 29 of RPDA 10.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An adapter for a ruggedized personal digital assistant (RPDA) having a groove for storing a stylus, a power-in port, and a serial data port, the adapter comprising:
    a generally L-shaped housing having a first leg and a second leg;
    the first leg having a generally tubular shape and a protruding ridge that is slidable in the groove of the RPDA;
    a bottom of the first leg including a connector for a multi-function cable;
    a top of the first leg including an opening for a communication cable;
    the second leg including a through-hole for receiving a thumbscrew, a top of the second leg including a power connector for engaging the power-in port of the RPDA and a serial data connector for engaging the serial data port of the RPDA;
    the first leg having disposed therein a multi-function cable assembly, which multi-function cable assembly is connected to the multi-function connector;
    wherein said multi-function cable assembly splits into first, second and third cables in the first leg;
    wherein the first cable extends through the opening in the top of the first leg;
    wherein the second cable connects to the power connector in the second leg;
    wherein the third cable connects to the serial data connector in the second leg;
    wherein the protruding ridge on the first leg includes a bulbous edge; and
    wherein a side of the first leg opposite a side having the protruding ridge includes a strap fixed thereon, the strap being fixed to a pair of spaced-apart projections, each of the spaced-apart projections including an opening therein for receiving the strap.

2. An apparatus, comprising:
    an RPDA having a groove for storing a stylus, a power-in port, and a serial data port; and
    an adapter removably fixed to the RPDA, the adapter including
        a generally L-shaped housing having a first leg and a second leg;
        the first leg having a generally tubular shape and a protruding ridge that slidably engages the groove of the RPDA, a bottom of the first leg including a connector for a multi-function cable, a top of the first leg including an opening for a communication cable;
        the second leg including a through-hole for receiving a thumbscrew, a top of the second leg including a power connector for engaging the power-in port of the RPDA and a serial data connector for engaging the serial data port of the RPDA;
        a thumbscrew disposed in the through-hole in the second leg and threadingly engaged in an opening in the RPDA adjacent the power-in port;
        the first leg having disposed therein a multi-function cable assembly connected to the multi-function cable connector, which multi-function cable assembly is split into first, second, and third cables in the first leg;
        wherein the first cable extends through the opening in the top of the first leg, the second cable connects to the power connector in the second leg, and the third cable connects to the serial data connector in the second leg;
        wherein the protruding ridge on the first leg includes a bulbous edge; and
        wherein a side of the first leg opposite a side having the protruding ridge includes a strap fixed thereon, the strap being fixed to a pair of spaced-apart projections, each of the spaced-apart projections including an opening therein for receiving the strap.

* * * * *